(No Model.) 2 Sheets—Sheet 2.
C. A. CARPENTER & J. HILL.
BRICK MACHINE.
No. 302,383. Patented July 22, 1884.
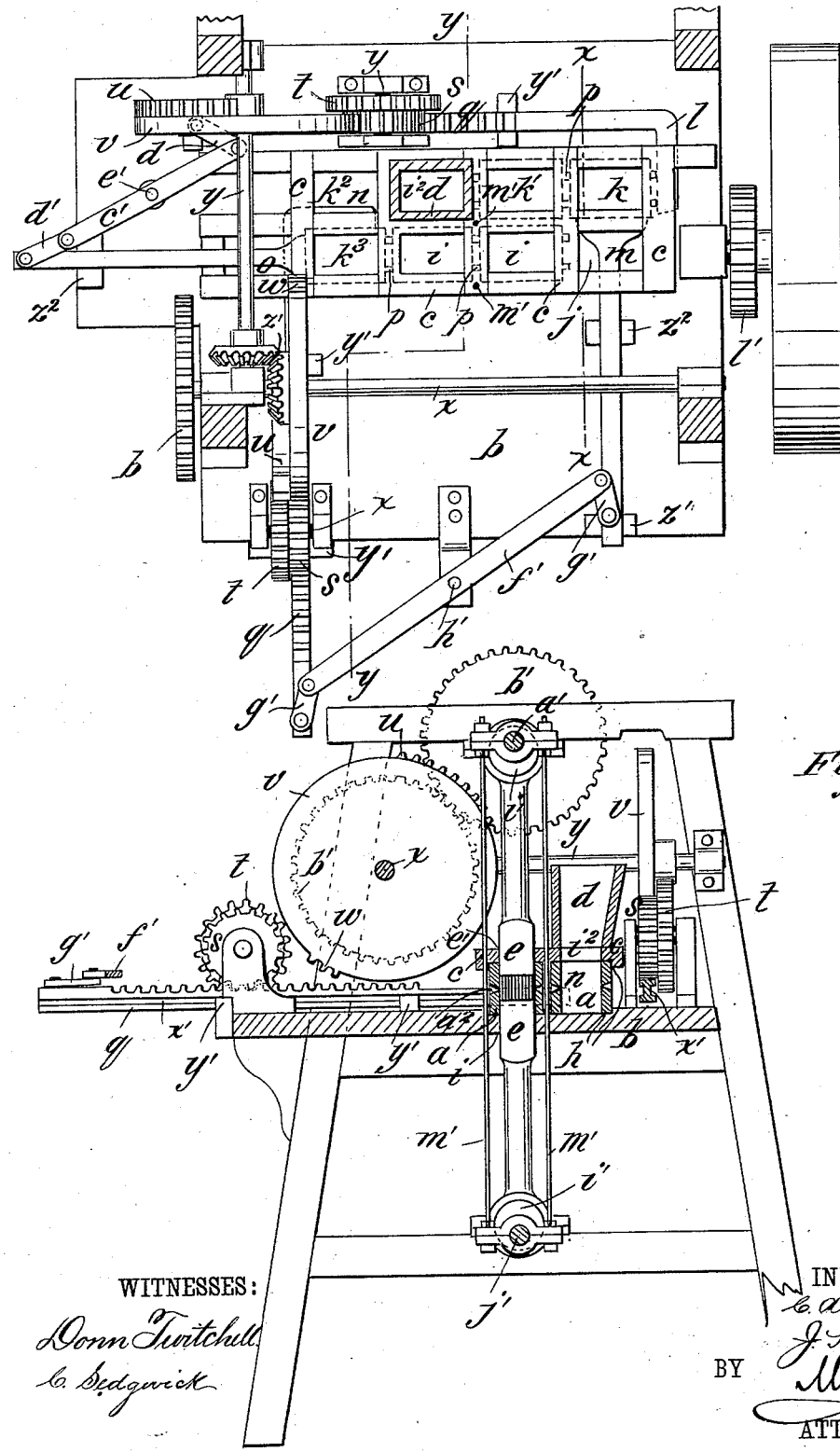

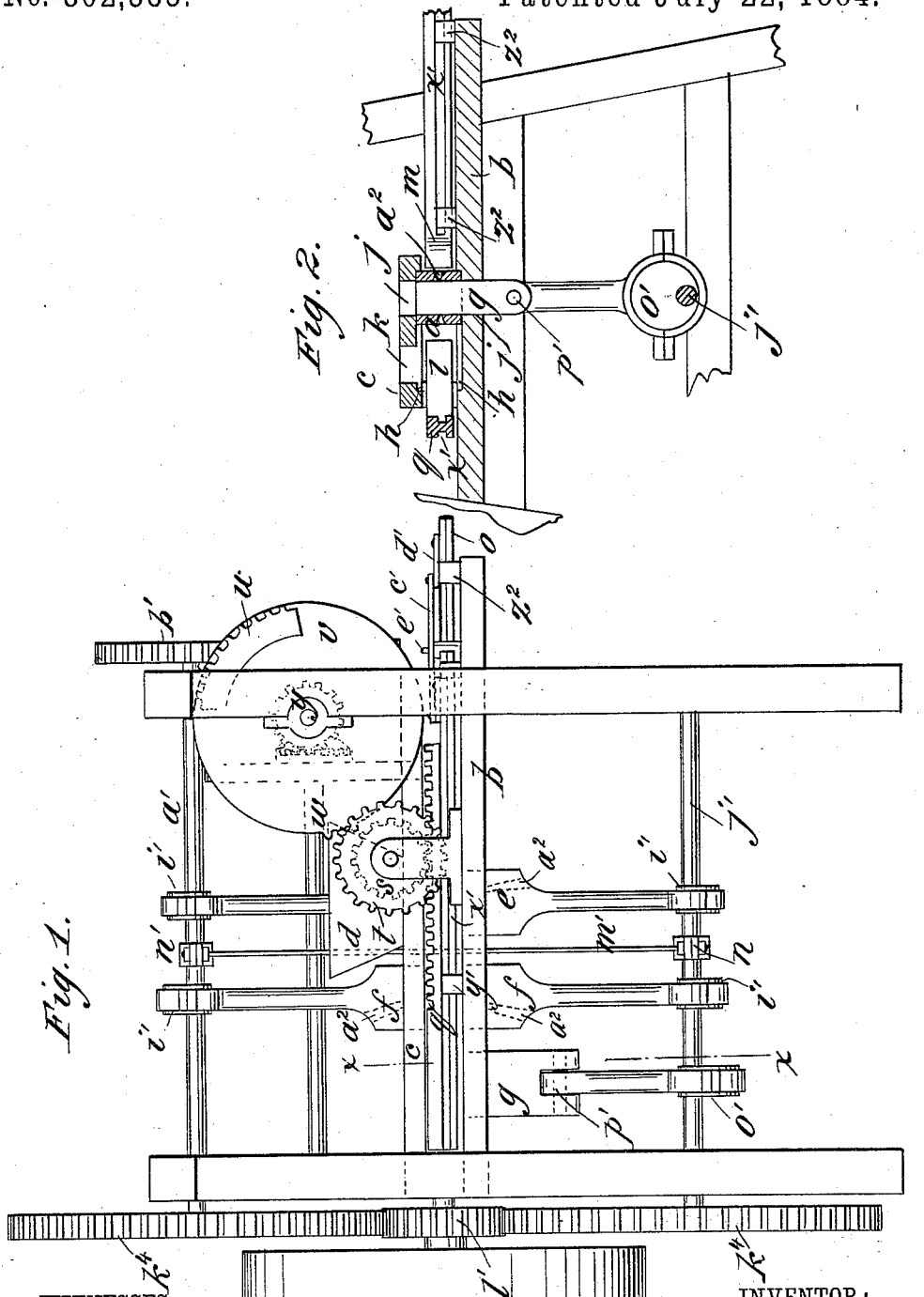

UNITED STATES PATENT OFFICE.

CHARLES A. CARPENTER AND JOSEPH HILL, OF KEOKUK, IOWA.

BRICK-MACHINE.

SPECIFICATION forming part of Letters Patent No. 302,383, dated July 22, 1884.

Application filed December 4, 1883. (No model.)

*To all whom it may concern:*

Be it known that we, CHARLES A. CARPENTER and JOSEPH HILL, of Keokuk, in the county of Lee and State of Iowa, have invented a new and Improved Brick-Machine, of which the following is a full, clear, and exact description.

Our invention consists of improvements in mechanism for filling the molds in which the clay is to be pressed, shifting them from the filling-hopper to a pair of pressers, and partly pressing the clay, thereby shifting the molds to another pair of pressers and completing the pressing thereby, then shifting them to a discharger, by which the pressed bricks are discharged, and then shifting them to the hopper to be refilled, all being automatically effected by simple, efficient, and reliable arrangements of apparatus, as hereinafter fully described.

Reference is to be had to the accompanying drawings, forming part of this specification, in which similar letters of reference indicate corresponding parts in all the figures.

Figure 1 is a side elevation of our improved machine. Fig. 2 is a detail in section on the line $x\ x$ of Figs. 1 and 3. Fig. 3 is a horizontal section, and Fig. 4 is a sectional elevation on the line $y\ y$ of Fig. 3.

We arrange a series of, say, six molds, $a$, between the table $b$ and the cover $c$, so as to be shifted around an endless way to be presented under the hopper $d$ to be filled, thence to the pressers $e$, to be partly pressed, thence to the pressers $f$, to be finally pressed, and thence to the discharger $g$, to be ejected from the molds. The molds are open at top and bottom, to admit the pressers $e$ and $f$ above and below, and they slide in recesses $h$ in the table $b$ and cover $c$, whereby the said molds are properly guided, and the cover $c$ and table $b$ have suitable openings, $i$, through them for admitting the pressers $e\ f$ to the molds and for guides to the said pressers. They also have openings $j$, for admitting the discharger $g$ and delivering the bricks, and the cover $c$ has an opening, $i^2$, at the bottom of the hopper, through which the molds are to be filled. The cover $c$ may have other openings, $k\ k'\ k^2\ k^3$, over the different positions of the molds in their passage along the endless way, or not, as preferred, and the table may also open under $k$ and $k'$, but it should be closed under $k^2$ and $k^3$, to retain the clay. The molds $a$ are passed along from under the hopper $d$ to the position $k^2$, in succession, by the pusher $l$, in front of which they are delivered by the pusher $m$, after being emptied by the discharger $g$, said molds being filled in passing under the hopper. From the position $k^2$ the filled molds are transferred to the position $k^3$ by the pusher $n$, and from $k^3$ they are passed along the pressers, by which the clay is pressed successively, and from them to the ejector by the pusher $o$. The molds have studs $p$ at one end, which maintain a little space between the ends of the molds, to allow any loose earth that may get between them to fall through the openings of the table, so as not to accumulate and clog the molds. Said molds are also constructed with slots or holes $a^2$ through the sides, and the pressers $e\ f$ are to have similar slots, which increase in dimensions from the inside outward to prevent clogging, which slots, or holes allow the air and surplus clay to escape, and also prevent the cracking of the pressed bricks by the expansion of the air as the pressers are removed from the molds.

The pushers $l$ and $n$ each have a toothed rack, $q$, with which a pinion, $s$, gears, which pinion is attached to the side of the larger wheel $t$, with which a toothed segment, $u$, on a disk, $v$, gears, to thrust said pushers forward to shift the molds $a$. The disks $v$ have a few teeth, $w$, on their peripheries, which gear directly with the racks $q$ to shift the pushers back, the teeth $w$ and the segments $u$ being placed opposite to each other, or thereabout, on said disks, to time the respective movements properly. The disk $v$, for working pusher $n$, is mounted on the shaft $x$, and the other disk, $v$, for working pusher $l$, is mounted on a shaft, $y$, which gears with shaft $x$ by the bevel-pinions $z$, and shaft $x$ is geared with the upper presser-shaft, $a'$, by the wheels $b'$.

Pusher $o$ is connected by lever $c'$ and links $d'$ with the toothed bar $q$ of pusher $l$, to be worked by it, and the lever $c'$ has a fulcrum at $e'$, so that said pushers shift simultaneously in opposite directions.

The pusher $m$ is connected by lever $f'$ and links $g'$ with the toothed bar $q$ of pusher $n$, to be worked by it, and the lever $f'$ has a fulcrum at $h'$, so that said pushers shift simultaneously in opposite directions.

The pressers $e$ and $f$ consist each of a pair, which are thrust forward simultaneously from opposite directions into the opposite sides of the molds, to compress the clay between them, said presser being worked by eccentrics $i'$, with which they are properly connected, and which are on the upper and lower presser-shafts, $a'$ and $j'$, respectively, which are geared by the spur-wheels $k^4$ with the pinion $l'$ on the shaft to which the driving-pulley is attached, and said presser-shafts being connected together by the stay-rods $m'$ and boxes $n'$ to resist the thrusts of the pressers. The discharger $g$ is also geared with the shaft $j'$ by an eccentric, $v'$, and it has a joint, $p'$, in its connecting-rod. The pressers may also be similarly jointed, if preferred. It will be seen that the mechanisms for effecting the forward and backward movements of the pushers $l$ and $n$ are very simple, and the contrivance of the levers $c'$ and $f'$, for similarly operating the pushers $m$ and $o$ by the same mechanisms, is also adapted to effect their movements with very few and simple devices.

The sliding rack-bars $q$ are grooved in the sides at $x'$, and suitably fixed in correspondingly-tongued guide-blocks, $y'$, for holding them, so as to work as required for shifting the boxes, and the bars of the pushers $m$ and $n$ are similarly fitted in guide-blocks $z''$.

Having thus described our invention, we claim as new and desire to secure by Letters Patent—

1. The combination of a series of separate and independent mold-boxes, $a$, arranged in an endless or rectangular way, and mechanism for moving said boxes around said way, with the filling-hopper $d$, pressers $e$ $f$, discharger $g$, and means for operating said pressers and discharger, substantially as set forth.

2. The separate and independent mold-boxes $a$, arranged in the endless ways $h$ of the table $b$ and cover $c$, in combination with the filling-hopper $d$, pressers $e f$, and discharger $g$, and having pushers $l$, $m$, $n$, and $o$, for shifting them around said endless way, substantially as described.

3. The combination, in a brick-machine, of the separate and independent molds, arranged in an endless way, and mechanism for moving said molds around said way, with a series of two or more pressers arranged to act successively on the clay in said molds, substantially as set forth.

4. In a series of separate and independent traveling brick-molds arranged to be pushed along one by the other, the said molds each having studs $p$ on the ends to maintain clearance-spaces for the escape of the clay from between the molds, substantially as described.

5. In a brick-machine, the molds having beveled slots formed in the sides, substantially as described, and for the purposes set forth.

6. The combination of the series of separate and independent traveling brick-molds $a$, open at top and bottom, the table $b$, having endless ways $h$ for the molds, and openings $i$ and $j$ for the pressers and discharger, and cover $c$, having ways $h$ for the molds, and openings $i$, $j$, and $i^2$ for the pressers, discharger, and filler, said molds being provided with the pushers, pressers, and discharger, substantially as described.

7. The combinations of mechanisms for reciprocating the pushers $l$ $n$, consisting of the toothed sliding bars $q$, pinions $s$, toothed wheels $t$, and the disks $v$, having segments $u$ and teeth $w$, said disks having continuous rotary motion, substantially as described.

8. The pushers $m$ $o$, respectively connected with the sliding toothed bars $q$ by levers and links, substantially as described.

9. The combination, with the mold-boxes $a$, open at top and bottom, of pressers converging therein and geared with presser-shafts $a'$ and $j'$, respectively, above and below said boxes, substantially as described.

10. In a brick-machine, the combination, with a series of open top and bottom molds arranged for movement in an endless way, of a series of pushers arranged to act alternately within the said way, substantially as described.

11. A brick-machine, in which the following elements are combined: separate and independent open top and bottom molds moving in an endless way, a table, and a cover, in which suitable openings are provided above and below the molds, and above which cover is a feeding-hopper, pushers arranged to be operated at regulated times to cause the mold-boxes to travel around in said ways, and pressers arranged in pairs, and the pairs to act alternately and with increased pressure, substantially as described.

12. The combination, in a brick-machine, with molds arranged to be moved in a rectangular and endless way, of two pairs of pressers and an ejector, and said ejector and pressers moved by eccentrics, and having jointed connections with said eccentrics, substantially as specified.

13. The combination, in a brick-machine, with molds having beveled slots in their sides, of pressers provided with beveled slots extending outward from their faces, as specified.

CHARLES A. CARPENTER.
  JOSEPH HILL.

Witnesses:
  J. L. CARPENTER,
  A. L. PARSONS.